United States Patent
Ko et al.

(10) Patent No.: US 11,370,858 B2
(45) Date of Patent: Jun. 28, 2022

(54) METHOD OF PREPARING CONJUGATED DIENE-BASED POLYMER AND APPARATUS FOR PREPARING CONJUGATED DIENE-BASED POLYMER

(71) Applicant: LG Chem, Ltd., Seoul (KR)

(72) Inventors: Jun Seok Ko, Daejeon (KR); Hoi In Jeong, Daejeon (KR); Woo Sung Hwang, Daejeon (KR); Dong Min Kim, Daejeon (KR); Jeong Seok Lee, Daejeon (KR)

(73) Assignee: LG Chem, Ltd.

( * ) Notice: Subject to any disclaimer, the term of this patent is extended or adjusted under 35 U.S.C. 154(b) by 163 days.

(21) Appl. No.: 16/631,640

(22) PCT Filed: Jan. 10, 2019

(86) PCT No.: PCT/KR2019/000381
§ 371 (c)(1),
(2) Date: Jan. 16, 2020

(87) PCT Pub. No.: WO2019/151672
PCT Pub. Date: Aug. 8, 2019

(65) Prior Publication Data
US 2020/0207888 A1    Jul. 2, 2020

(30) Foreign Application Priority Data
Feb. 5, 2018 (KR) .................. 10-2018-0013779

(51) Int. Cl.
*C08F 36/06* (2006.01)
*B01J 19/00* (2006.01)
*B01J 19/24* (2006.01)

(52) U.S. Cl.
CPC ............. *C08F 36/06* (2013.01); *B01J 19/245* (2013.01); *B01J 19/2445* (2013.01); *B01J 2219/0004* (2013.01); *B01J 2219/00038* (2013.01)

(58) Field of Classification Search
CPC ........ B01J 19/00; B01J 19/24; B01J 19/2445; B01J 19/245; B01J 2219/00;
(Continued)

(56) References Cited

U.S. PATENT DOCUMENTS 10,246,534 B2 * 4/2019 Hwang ................. C08F 136/06
10,259,897 B2 * 4/2019 Hwang ................. C08F 136/06
(Continued)

FOREIGN PATENT DOCUMENTS

CN    203033923 U    7/2013
CN    106977629 A    7/2017
(Continued)

OTHER PUBLICATIONS

Extended European Search Report including Written Opinion for Application No. EP19748391.0, dated May 25, 2020, pp. 1-6.
(Continued)

*Primary Examiner* — Natasha E Young
(74) *Attorney, Agent, or Firm* — Lerner, David, Littenberg, Krumholz & Mentlik, LLP

(57) ABSTRACT

A method of preparing a conjugated diene-based polymer is provided. The method includes: adding a conjugated diene-based monomer, a catalyst, and a solvent to parallel polymerization reactors, performing a polymerization reaction to prepare a first polymer solution including a first conjugated diene-based polymer; and adding the first polymer solution to a polymerization reactor connected in series to the parallel polymerization reactors, performing the polymerization reaction to prepare a second polymer solution including a
(Continued)

second conjugated diene-based polymer. After the polymerization reaction in the series polymerization reactor, gas produced by polymerization heat is condensed in the series polymerization reactor and refluxed to the parallel polymerization reactors, and a reaction temperature of the series polymerization reactor is maintained to be lower than a reaction temperature of the parallel polymerization reactors by 10° C. or more.

15 Claims, 1 Drawing Sheet

(58) Field of Classification Search
CPC .... B01J 2219/00004; B01J 2219/00027; B01J 2219/00038; B01J 2219/0004; C08F 2/00; C08F 2/001; C08F 2/01; C08F 4/00; C08F 4/42; C08F 4/44; C08F 4/46; C08F 4/48; C08F 4/52; C08F 4/60; C08F 4/62; C08F 4/619; C08F 4/639; C08F 36/00; C08F 36/02; C08F 36/04; C08F 36/06; C08F 136/00; C08F 136/02; C08F 136/04; C08F 136/06
See application file for complete search history.

(56) References Cited

U.S. PATENT DOCUMENTS

| | | |
|---|---|---|
| 2002/0107339 A1 | 8/2002 | Knauf et al. |
| 2018/0037683 A1 | 2/2018 | Hwang et al. |
| 2018/0051108 A1 | 2/2018 | Hwang et al. |

FOREIGN PATENT DOCUMENTS

| | | | |
|---|---|---|---|
| EP | 0180853 B1 | | 10/1989 |
| JP | 2002363204 A | | 12/2002 |
| KR | 20170047031 A | | 5/2017 |
| KR | 20170047032 A | | 5/2017 |
| KR | 20170053467 A | | 5/2017 |
| KR | 20170089112 A | | 8/2017 |
| SU | 412204 A | * | 9/1974 |
| WO | 201769494 A1 | | 4/2017 |
| WO | 201769495 A1 | | 4/2017 |

OTHER PUBLICATIONS

International Search Report for Application No. PCT/KR2019/000381, dated Apr. 23, 2019, pp. 1-2.

* cited by examiner

METHOD OF PREPARING CONJUGATED DIENE-BASED POLYMER AND APPARATUS FOR PREPARING CONJUGATED DIENE-BASED POLYMER

CROSS-REFERENCE TO RELATED APPLICATIONS

The present application is a national stage entry under 35 U.S.C. § 371 of PCT/KR2019/000381, now WO 2019/0151672, filed on Jan. 10, 2019, which claims priority to Korean Patent Application No. 10-2018-0013779, filed on Feb. 5, 2018, the disclosures of which in their entirety are incorporated herein as a part of the specification.

TECHNICAL FIELD

The present invention relates to a method of preparing a conjugated diene-based polymer, and more particularly, to a method of preparing a conjugated diene-based polymer and an apparatus for preparing a conjugated diene-based polymer for carrying out the method.

BACKGROUND ART

A conjugated diene-based rubber such as a butadiene rubber is prepared by polymerization of a conjugated diene-based monomer such as 1,3-butadiene, and the physical properties of the polymer are greatly changed depending on a double bond structure in a conjugated diene-based monomer molecule when forming the polymer, that is, as to whether the structure is cis or trans, a vinyl content therein, and the like, and this is greatly dependent on the kinds of catalyst compounds.

In general, the butadiene rubber is prepared by solution polymerization using two or more continuous polymerization reactors using a hydrocarbon-based solvent such as hexane, cyclohexane, heptane, and toluene. Upon polymerization, the smaller the amount of the used solvent is, the higher the ratio of the monomer is, and upon solution polymerization in a polymerization reactor having the same size, productivity is improved.

However, as the ratio of the monomer relative to the solvent is improved, solubility of the polymer in the solvent in the polymerization reactor is decreased, so that a polymer concentration is divided into a high portion and a low portion, and it is difficult to maintain a uniform reaction state to form the polymer non-uniformly, resulting in a problem of broadening a molecular weight distribution.

In addition, as the ratio of the polymer in the polymerization reactor is increased, adhesion of the polymer on a wall surface, a stirrer, a pipe, or the like of the polymerization reactor is accelerated to form a gel, which has a profound effect on quality of a product, and thus, when the gel is formed, operation of the polymerization reactor is stopped and washing should be carried out. The gel is formed mainly in the first polymerization reactor, and gel production may be prevented only by maintaining the content of the monomer relative to a solvent added as a raw material for preventing gel formation in the polymerization reactor at or below a certain level, which causes a problem of leading to a decreased productivity.

DISCLOSURE

Technical Problem

A technical problem to be solved in the present invention is to improve productivity of a conjugated diene-based polymer while preventing gel production in a polymerization reactor, in order to solve the problems mentioned in the above background art.

That is, the present invention has been conceived for solving the problems of the prior art, and decreases a polymer concentration in a first polymerization reactor and increases a polymer concentration in a final polymerization reactor, thereby allowing a conjugated diene-based polymer at a high concentration to be prepared. Accordingly, an object of the present invention is to provide a method of preparing a conjugated diene-based polymer which may, after preparation of the conjugated diene-based polymer, reduce energy required in a process of removing a solvent and unreacted monomers from a polymer solution and recovering the polymer, and furthermore, prevent gel production in a first polymerization reactor, and an apparatus for preparing a conjugated diene-based polymer for carrying out the method.

Technical Solution

In one general aspect, a method of preparing a conjugated diene-based polymer includes: adding a conjugated diene-based monomer, a catalyst, and a solvent to parallel polymerization reactors in which two or more polymerization reactors are connected in parallel and performing a polymerization reaction to prepare a first polymer solution including a first conjugated diene-based polymer; and adding the first polymer solution discharged from the parallel polymerization reactors to a series polymerization reactor connected in series to the parallel polymerization reactors and performing the polymerization reaction to prepare a second polymer solution including a second conjugated diene-based polymer, wherein upon the polymerization reaction in the series polymerization reactor, gas produced by polymerization heat is condensed by a condenser provided in the series polymerization reactor and refluxed to the parallel polymerization reactors, and a reaction temperature of the series polymerization reactor is maintained to be lower than a reaction temperature of the parallel polymerization reactors by 10° C. or more.

In another general aspect, an apparatus for preparing a conjugated diene-based polymer includes: parallel polymerization reactors in which two or more polymerization reactors are connected in parallel; and a series polymerization reactor connected in series to the parallel polymerization reactors, wherein the series polymerization reactor is provided with a condenser for condensing gas produced by polymerization heat and refluxing the gas to the parallel polymerization reactors, and a reaction temperature of the series polymerization reactor is maintained to be lower than a reaction temperature of the parallel polymerization reactors by 10° C. or more.

Advantageous Effects

When a conjugated diene-based polymer is prepared by the method of preparing a conjugated diene-based polymer and the apparatus for preparing a conjugated diene-based polymer according to the present invention, a polymer concentration in a first polymerization reactor is decreased and a polymer concentration in a final polymerization reactor is increased, whereby a conjugated diene-based polymer at a high concentration may be prepared in the final polymerization reactor. Accordingly, the present invention has an effect of, after preparation of the conjugated diene-based polymer, reducing energy required in a process of removing a solvent and unreacted monomers from a polymer solution and recovering the polymer, and furthermore, preventing gel production in the first polymerization reactor.

BEST MODE

Figure 1:
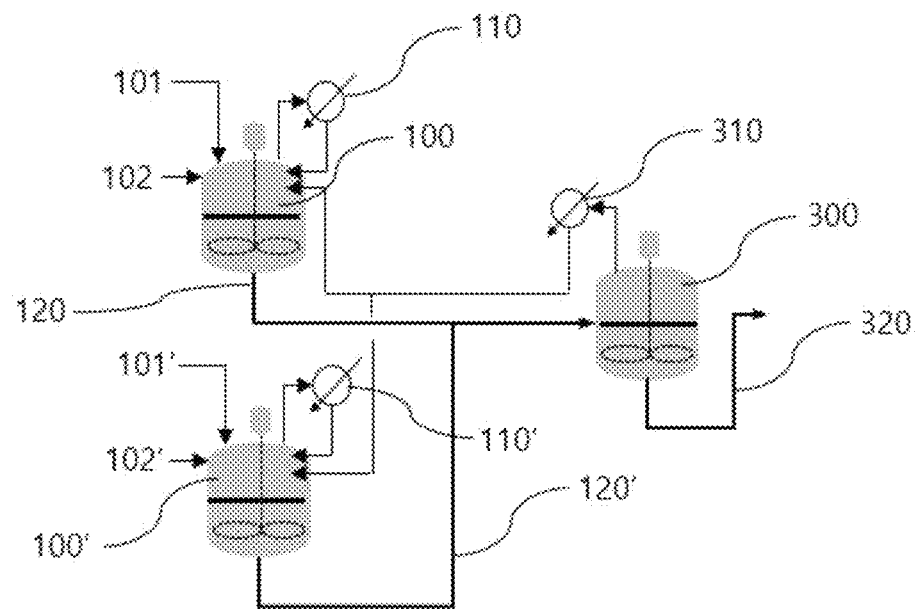
FIG. 1 is a process flow diagram for describing a method of preparing a conjugated diene-based polymer according to an exemplary embodiment in the present application.

The terms and words used in the description and claims of the present invention are not to be construed as a general or dictionary meaning but are to be construed as meaning and concepts meeting the technical ideas of the present invention based on a principle that the inventors can appropriately define the concepts of terms in order to describe their own inventions in best mode.

Hereinafter, the present invention will be described in more detail for understanding the present invention.

The method of preparing a conjugated diene-based polymer according to the present invention may include a step of adding a conjugated diene-based monomer, a catalyst, and a solvent to parallel polymerization reactors 100 and 100' in which two or more polymerization reactors are connected in parallel and performing a polymerization reaction to prepare a first polymer solution including a first conjugated diene-based polymer; and a step of adding the first polymer solution discharged from the parallel polymerization reactors 100 and 100' to a series polymerization reactor 300 connected in series to the parallel polymerization reactors and performing the polymerization reaction to prepare a second polymer solution including a second conjugated diene-based polymer. Upon the polymerization reaction in the series polymerization reactor 300, gas produced by polymerization heat is condensed by a condenser 310 provided in the series polymerization reactor 300 and refluxed to the parallel polymerization reactors 100 and 100', and a reaction temperature of the series polymerization reactor 300 may be maintained to be lower than a reaction temperature of the parallel polymerization reactors 100 and 100' by 10° C. or more.

According to an exemplary embodiment of the present invention, the method of preparing a conjugated diene-based polymer may be a continuous preparation method of a conjugated diene-based polymer, and as a specific example, may be a continuous preparation method using a continuous preparation apparatus of a conjugated diene-based polymer, and as a more specific example, may be a continuous preparation method in which processes from addition of the monomer, the catalyst and the solvent to recovery of the conjugated diene-based polymer are continuously carried out.

According to an exemplary embodiment of the present invention, the parallel polymerization reactors 100 and 100' in which two or more polymerization reactors are connected in parallel are used as a first polymerization reactor, as in the present invention, whereby a polymerization reaction to produce more polymers simultaneously is possible as compared with the case of using one polymerization reactor to improve polymerization productivity, and added contents of the monomer, the catalyst, and the solvent to be added per one polymerization reactor may be easily adjusted.

In this regard, if it is not the case that the parallel polymerization reactors in which two or more polymerization reactors are connected in parallel are used as the first polymerization reactor, and the polymerization solution discharged from the two or more polymerization reactors are simultaneously added to the second or the final polymerization reactor, so that the solvent and the monomer vaporized by polymerization heat in the second or final polymerization reactor are recovered and refluxed to the first polymerization reactor, when a ratio of the added monomer relative to the added solvent to the first polymerization reactor is increased, a ratio of the monomer relative to the solvent in the first polymerization reactor is increased to accelerate gel production, and thus, the amount of the added solvent relative to the monomer should be increased. Accordingly, the content of the solvent remaining in the second or final polymerization reactor is increased, resulting in a decrease in a concentration of the polymer in the polymer solution, and accordingly, when the polymer is recovered later, energy for removing unreacted monomers and a solvent is excessively required.

However, according to the present invention, when the polymerization reaction is carried out in the parallel polymerization reactors 100 and 100' in which two or more polymerization reactors are connected in parallel and the series polymerization reactor 300 connected in series thereto, the reaction temperature of the series polymerization reactor 300 is maintained to be lower than the reaction temperature of the parallel polymerization reactors by 10° C. or more, 10° C. to 50° C., or 10° C. to 25° C., and gas produced by polymerization heat from the condenser 310 provided in the series polymerization reactor 300 is refluxed to the parallel polymerization reactors 100 and 100', whereby even in the case that a ratio of the added monomer relative to the added solvent to the first polymerization reactor is increased, a ratio of the monomer relative to the solvent which is maintained upon reaction in the first polymerization reactor may be decreased. In addition, accordingly, the polymer solution at high concentration may be prepared in the final polymerization reactor, and the ratio of the solvent relative to the monomer in the parallel polymerization reactors 100 and 100' is improved to decrease a concentration of the polymer solution prepared in the parallel polymerization reactors 100 and 100', thereby having an effect of preventing gel production in the parallel polymerization reactors 100 and 100'.

In addition, according to an exemplary embodiment of the present invention, a pressure of the series polymerization reactor 300 may be maintained to be lower than a pressure of the parallel polymerization reactors 100 and 100' by 0.5 barg or more, 0.5 barg to 3.0 barg, or 0.5 barg to 2.5 barg, simultaneously with adjustment of the reaction temperature of the series polymerization reactor 300. In this case, even in the case that the ratio of the added monomer relative to the added solvent to the first polymerization reactor is increased, the ratio of the monomer relative to the solvent maintained upon reaction in the first polymerization reactor may be decreased, and thus, the polymer solution at high concentration may be prepared in the final polymerization reactor, and the ratio of the solvent relative to the monomer in the parallel polymerization reactors 100 and 100' is improved to decrease a concentration of the polymer solution prepared in the parallel polymerization reactors 100 and 100', thereby having an effect of preventing gel production in the parallel polymerization reactors 100 and 100'.

According to an exemplary embodiment of the present invention, the gas produced by polymerization heat in the series polymerization reactor 300 may include the solvent vaporized by the polymerization heat and the unreacted monomers, and may be condensed, that is, liquefied by the condenser 310 and refluxed to the parallel polymerization reactors 100 and 100', as described above. The solvent vaporized in the polymerization reactor and the unreacted monomers are generally resupplied to the polymerization reactor using the condenser; however, according to the present invention, the solvent vaporized in the series polymerization reactor 300 is refluxed to the parallel polymerization reactors 100 and 100', whereby the solvent in a gaseous phase which naturally occurs by the polymerization heat may be resupplied to the parallel polymerization reactors 100 and 100'. Accordingly, the content of the solvent in the series polymerization reactor 300 is continuously reduced, thereby having an effect of allowing the preparation of the conjugated diene-based polymer solution at a high concentration.

Figure 2:
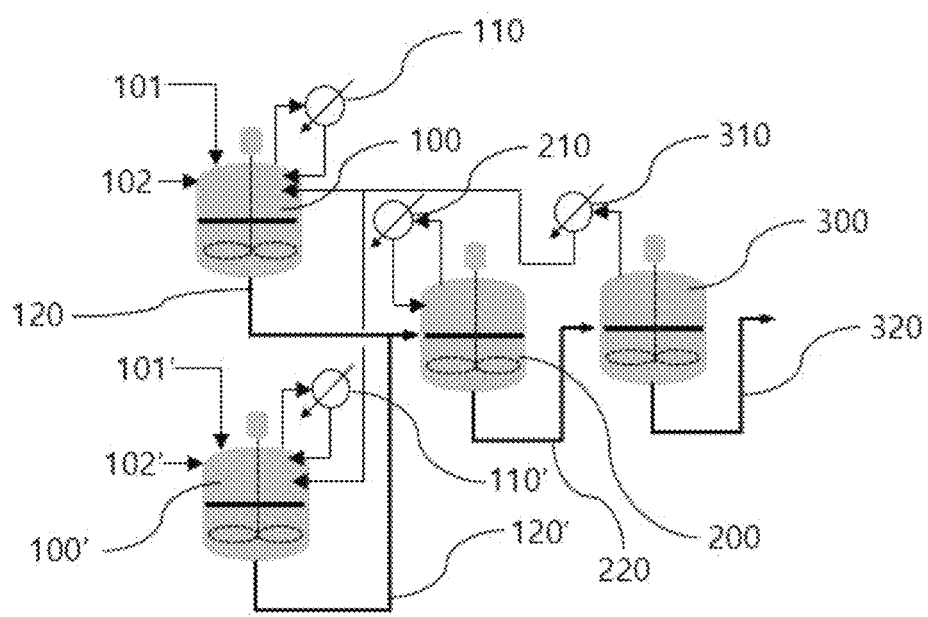
FIG. 2 is a process flow diagram for describing a method of preparing a conjugated diene-based polymer according to another exemplary embodiment in the present application.

In addition, according to an exemplary embodiment of the present invention, for convenience of description, FIGS. 1 and 2 show the parallel polymerization reactors 100 and 100' in which two polymerization reactors are connected in parallel, however, the parallel polymerization reactors 100 and 100' in which two or more polymerization reactors are connected in parallel are not limited to those having two polymerization reactors, and if necessary, may be the parallel polymerization reactors in which 2 to 5, 2 to 4, or 2 to 3 polymerization reactors are connected in parallel.

In addition, according to an exemplary embodiment of the present invention, the method of preparing a conjugated diene-based polymer may further include a step of adding the first polymer solution discharged from the parallel polymerization reactors 100 and 100' to one or more polymerization reactors 200 connected in series between the parallel polymerization reactors 100 and 100' and the series polymerization reactor 300, and performing the polymerization reaction. In this case, it is easy to adjust a polymerization conversion rate for each of the polymerization reactors connected in series, and a side reaction upon the polymerization reaction is prevented. However, in this case, the reaction temperature of the series polymerization reactor 300 may be maintained to be lower than the reaction temperature of the polymerization reactor 200 which is directly connected to the series polymerization reactor, among one or more polymerization reactors 200 connected in series between the parallel polymerization reactors 100 and 100' and the series polymerization reactor 300, by 10° C. or more, 10° C. to 50° C., or 10° C. to 25° C. As a specific example, in this case, the reaction temperature of the series polymerization reactor 300 may be maintained to be lower than the reaction temperature of the polymerization reactor 200 which is directly connected to the series polymerization reactor 300, among one or more polymerization reactors 200 connected in series between the parallel polymerization reactors 100 and 100' and the series polymerization reactor 300, by 10° C. or more, 10° C. to 50° C., or 10° C. to 25° C., regardless of the reaction temperature of the parallel polymerization reactors 100 and 100'. In this case, the content of the solvent in the series polymerization reactor 300 is continuously reduced, thereby having an effect of allowing the preparation of the polymer solution at a high concentration in the final polymerization reactor.

In addition, according to an exemplary embodiment of the present invention, for convenience of description, FIG. 2 shows that the number of the one or more polymerization reactors 200 connected in series between the parallel polymerization reactors 100 and 100' and the series polymerization reactor 300 is one; however, the number of the one or more polymerization reactors 200 connected in series between the parallel polymerization reactors 100 and 100' and the series polymerization reactor 300 is not limited to one, and if necessary, the polymerization reactor may be the polymerization reactor in which 1 to 5, 1 to 4, or 1 to 3 polymerization reactors are connected in series.

In addition, according to an exemplary embodiment of the present invention, in this case, a pressure of the series polymerization reactor 300 may be maintained to be lower than a pressure of the polymerization reactor 200 directly connected to the series polymerization reactor, among the one or more polymerization reactors 200 connected in series between the parallel polymerization reactors 100 and 100' and the series polymerization reactor 300, by 0.5 barg or more, 0.5 barg to 3.0 barg, or 0.5 barg to 2.5 barg, simultaneously with adjustment of the reaction temperature of the series polymerization reactor 300. As a specific example, in this case, the pressure of the series polymerization reactor 300 may be maintained to be lower than the pressure of the polymerization reactor 200 directly connected to the series polymerization reactor 300, among one or more polymerization reactors 200 connected in series between the parallel polymerization reactors 100 and 100' and the series polymerization reactor 300, by 0.5 barg or more, 0.5 barg to 3.0 barg, or 0.5 barg to 2.5 barg, regardless of the pressure of the parallel polymerization reactors 100 and 100', and in this case, the content of the solvent in the series polymerization reactor 300 is continuously reduced, thereby having an effect of allowing the preparation of the polymer solution at a high concentration in the final polymerization reactor.

Meanwhile, according to an exemplary embodiment of the present invention, the polymerization reaction in the parallel polymerization reactors 100 and 100' in which two or more polymerization reactors are connected in parallel may be solution polymerization carried out in the presence of a conjugated diene-based monomer, a catalyst, and a solvent. In addition, the reaction temperature may be 80° C. or more, 80° C. to 120° C., 80° C. to 95° C., or 85° C. to 95° C., and the pressure may be 1.0 barg or more, 1.0 barg to 3.0 barg, or 1.0 barg to 2.5 barg.

In addition, according to an exemplary embodiment of the present invention, the polymerization reaction in the series polymerization reactor 300 may be solution polymerization carried out in the presence of the conjugated diene-based polymer and the unreacted monomers in the polymer solution in the series polymerization reactor 300, in which the reaction temperature may be 110° C. or less, 50° C. to 100° C., 67° C. to 90° C., or 70° C. to 90° C., and the pressure may be 3.0 barg or less, 0.1 barg to 2.0 barg, or 0.3 barg to 1.0 barg.

According to an exemplary embodiment of the present invention, the catalyst for performing the polymerization reaction may be one or more Ziegler-Natta catalysts selected from the group consisting of transition metal compounds, lanthanum-based compounds, organic aluminum compounds, and fluorinated compounds; or an organolithium catalyst.

As a specific example, the transition metal compound may be a lithium, cobalt, nickel, or titanium compound, and as a more specific example, may be a transition metal halogen complex compound bonded to a halogen compound such as chlorine or bromine, or those containing a ligand having good solubility in a nonpolar solvent, and one or more selected from the group consisting of nickel benzoate, nickel acetate, nickel naphthenate, nickel octanoate, nickel neodecanoate, nickel 2-ethylhexanoate, bis(-A-allylnickel), bis(n-cycloocta-1,5-diene), bis(n-allyl nickel trifluoroacetate), bis(a-furyldioxime) nickel, nickel palmitate, nickel stearate, nickel acetylacetonate, nickel salicaldehyde, bis (salicylaldehyde) ethylenediimine nickel, bis(cyclopentadiene) nickel, cyclopentadienyl nickel nitrocyl, and nickel tetracarbonyl.

In addition, as a specific example, the lanthanum-based compound may be those using elements from lanthanum of atomic number 57 to ruthenium of atomic number 71, and as a more specific example, may be a lanthanum, cerium, gadolinium, and neodymium compounds, may be one or more selected from the group consisting of halogen complexes of a lanthanum series metal bonded to a halogen compound such as chlorine or bromine compound, or carboxylate, alcoholate, acetylacetonate, and allyl derivative compounds of a lanthanum series metal containing a ligand having good solubility in a nonpolar solvent, or may be one or more selected from the group consisting of neodymium versatate, neodymium naphthalenate, neodymium octanoate, neodymium octoate, neodymium trichloride, a neodymium trichloride complex formed together with tetrahydrofuran ($NdCl_3(THF)_2$), and a neodymium trichloride complex formed together with ethanol ($NdCl_3(EtOH)_3$), neodymium 2,2-diethylhexanoate, neodymium 2-ethylhexoate, neodymium 2-ethyloctoate, neodymium 2,2-diethylheptanoate, allyl neodymium dichloride, bis-allyl neodymium chloride, and tris-allyl neodymium.

In addition, as a specific example, the organoaluminum compound may be one or more selected from the group consisting of alkyl aluminum, halogenated alkyl aluminum, or aluminoxane, and as a more specific example, trimethyl aluminum, triethyl aluminum, tripropyl aluminum, tributyl aluminum, triisobutyl aluminum, trihexyl aluminum, diisobutylaluminum hydride, and diethylaluminum chloride.

In addition, according to an exemplary embodiment of the present invention, the organolithium catalyst may be one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyllithium, 4-butylphenyllithium, 4-tolyllithium, cyclohexyllithium, 3,5-di-n-heptylcyclohexyllithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

According to an exemplary embodiment of the present invention, the solvent may be a hydrocarbon-based solvent, and as a specific example, may be an aliphatic, alicyclic, or aromatic hydrocarbon having 4 to 6 carbon atoms, or a mixture thereof, and as a more specific example, the aliphatic hydrocarbon may be one or more selected from the group consisting of butane, pentane, hexane, isopentane, heptane, octane, and isooctane, the alicyclic hydrocarbon may be one or more selected from the group consisting of cyclopentane, methylcyclopentane, cyclohexane, methylcyclohexane, and ethylcyclohexane, and the aromatic hydrocarbon may be ono or more selected from the group consisting of benzene, toluene, ethylbenzene, and xylene. As a more specific example, the solvent may be pentane, hexane, heptane, cyclohexane, methylcyclohexane, benzene, and toluene, and the solvent may be used with water and oxygen being removed therefrom, and may be used after being distilled and dried therefor.

In addition, according to an exemplary embodiment of the present invention, the conjugated diene-based monomer for forming the conjugated diene-based monomer-derived repeating unit may be one or more selected from the group consisting of 1,3-butadiene, 2,3-dimethyl-1,3-butadiene, 2-ethyl-1,3-butadiene, 1,3-pentadiene, and isoprene, and as a specific example, may be 1,3-butadiene or isoprene, and as a more specific example, may be 1,3-butadiene.

According to an exemplary embodiment of the present invention, the polymerization reaction may be carried out by further including common polymerization adjusting agent, reaction terminator, anti-oxidant, antifouling agent, lubricant, or the like.

In addition, according to an exemplary embodiment of the present invention, the conjugated diene-based polymer in the conjugated diene-based polymer solution prepared by the method of preparing a conjugated diene-based polymer may be a butadiene rubber (BR), a nickel-catalyzed butadiene rubber (NiBR), or a neodymium catalyzed butadiene rubber (NdBR).

In addition, according to the present invention, an apparatus for preparing a conjugated diene-based polymer for carrying out the method of preparing a conjugated diene-based polymer is provided. The apparatus for preparing a conjugated diene-based polymer includes parallel polymerization reactors 100 and 100' in which two or more polymerization reactors are connected in parallel; and a series polymerization reactor 300 connected in series to the parallel polymerization reactors 100 and 100', wherein the series polymerization reactor 300 is provided with a condenser 310 for condensing gas produced by polymerization heat and refluxing the gas to the parallel polymerization reactors 100 and 100', and a reaction temperature of the series polymerization reactor 300 may be maintained to be lower than a reaction temperature of the parallel polymerization reactors by 10° C. or more, 10° C. to 50° C., or 10° C. to 25° C.

According to an exemplary embodiment of the present invention, the parallel polymerization reactors 100 and 100' in which two or more polymerization reactors are connected in parallel and the series polymerization reactor 300 may be all continuous stirred tank reactors (CSTR). In addition, according to an exemplary embodiment of the present invention, the parallel polymerization reactors 100 and 100' in which two or more polymerization reactors are connected in parallel and the series polymerization reactor 300 may be the same continuous stirred tank reactor.

According to an exemplary embodiment of the present invention, the parallel polymerization reactors 100 and 100' in which two or more polymerization reactors are connected in parallel may be provided with supply pipes 101 and 101' for adding a monomer and a solvent to each of the polymerization reactors, and supply pipes 102 and 102' for adding a catalyst to each of the polymerization reactors, respectively.

In addition, according to an exemplary embodiment of the present invention, the parallel polymerization reactors 100 and 100' in which two or more polymerization reactors are connected in parallel may be provided with condensers 110 and 110' for condensing gas produced by polymerization heat, respectively and refluxing the gas to each of the parallel polymerization reactors 100 and 100'.

In addition, according to an exemplary embodiment of the present invention, the parallel polymerization reactors 100 and 100' in which two or more polymerization reactors are connected in parallel may be provided with first polymer solution discharge pipes 120 and 120' connected to the lower portion of the parallel polymerization reactors 100 and 100', for supplying the prepared first polymer solution to the series polymerization reactor 300.

In addition, according to an exemplary embodiment of the present invention, the apparatus for preparing a conjugated diene-based polymer may include one or more polymerization reactors 200 connected in series between the parallel polymerization reactors 100 and 100' and the series polymerization reactor 300. In this case, the polymerization reactor 200 may be a continuous stirred tank reactor (CSTR), and as a specific example, may be the continuous stirred tank reactor which is identical to the parallel polymerization reactors 100 and 100' in which two or more polymerization reactors are connected in parallel and the series polymerization reactor 300. In addition, according to an exemplary embodiment of the present invention, the polymerization reactor 200 may be provided with the condenser 210 for condensing gas produced by polymerization heat and refluxing the gas to the polymerization reactor 200, or the parallel polymerization reactors 100 and 100' in which two or more polymerization reactors are connected in parallel.

In addition, according to an exemplary embodiment of the present invention, when the apparatus for preparing a conjugated diene-based polymer includes one or more polymerization reactors 200 connected in series between the parallel polymerization reactors 100 and 100' and the series polymerization reactor 300, the reaction temperature of the series polymerization reactor 300 may be maintained to be lower than the reaction temperature of the polymerization reactor 200 which is directly connected to the series polymerization reactor, among one or more polymerization reactors 200 connected in series between the parallel polymerization reactors 100 and 100' and the series polymerization reactor 300, by 10° C. or more, 10° C. to 50° C., or 10° C. to 25° C.

In addition, according to an exemplary embodiment of the present invention, the series polymerization reactor 300 discharges a prepared second polymer solution and removes the unreacted monomers and the solvent, and for transferring the second polymer solution as a subsequent process for recovering the second conjugated diene-based polymer, may be provided with a second polymer solution discharge pipe 320 connected to the lower portion of the series polymerization reactor 300.

In addition, according to an exemplary embodiment of the present invention, when the apparatus for preparing a conjugated diene-based polymer includes one or more polymerization reactors 200 connected in series between the parallel polymerization reactors 100 and 100' and the series polymerization reactor 300, the polymerization reactor 200 may be, for transferring the prepared second polymer solution to the series polymerization reactor 300, provided with the second polymer solution discharge pipe 220 connected to the lower portion of the polymerization reactor 200.

Regarding the apparatus for preparing a conjugated diene-based polymer according to the present invention, other descriptions are identical to those for the method of preparing a conjugated diene-based polymer, as described above.

Hereinafter, the present invention will be described in more detail by the Examples. However, the following Examples are provided for illustrating the present invention. It is apparent to a person skilled in the art that various modifications and alterations may be made without departing from the scope and spirit of the present invention, and the scope of the present invention is not limited thereto.

Example 1

Example 1-1

Two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for resupplying the gas condensed from the condenser to the polymerization reactor, a polymer solution discharge pipe for discharging a polymer solution including a polymer produced by the polymerization reaction to the lower portion, and a supply pipe for supplying a monomer, a solvent and a catalyst to the side wall were provided, as shown in FIG. 1 were connected in parallel. A continuous stirred tank reactor, in which the polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for supplying the gas condensed from the condenser to the two polymerization reactors connected in parallel, a polymer solution discharge pipe for discharging a polymer solution including a polymer produced by the polymerization reaction to the lower portion, and a supply pipe for supplying the polymer solution which is discharged from the two polymerization reactors connected in parallel to the side wall were provided were connected in series to the two polymerization reactors connected in parallel, was used.

1,3-Butadiene as the monomer at a flow rate of 7,250 kg/h, hexane as the solvent at a flow rate of 17,681 kg/h, and a catalyst composition including nickel octoate, hydrogen fluoride (HF), and triisobutylaluminum (TIBAL) diluted in a hexane solvent at a flow rate of 220 kg/h were added to the two polymerization reactors connected in parallel, respectively. The reaction temperature of each of the polymerization reactors was controlled to 95° C., and the pressure thereof was controlled to 2.9 barg to carry out the polymerization reaction. The gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 75° C. and the pressure thereof was controlled to 0.5 barg to further carry out the polymerization reaction, and the gas produced by polymerization heat was condensed by the condenser and simultaneously refluxed to the two polymerization reactors connected in parallel.

Example 1-2

Two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for resupplying the gas condensed from the condenser to the polymerization reactor, a polymer solution discharge pipe for discharging a polymer solution including a polymer produced by the polymerization reaction to the lower portion, and a supply pipe for supplying a monomer, a solvent and a catalyst to the side wall were provided, as shown in FIG. 2 were connected in parallel. A continuous stirred tank reactor, in which two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for supplying the gas condensed from the condenser to each of the two polymerization reactors connected in parallel, a polymer solution discharge pipe for discharging a polymer solution including a polymer produced by the polymerization reaction to the lower portion, and a supply pipe for supplying the polymer solution which is discharged from the two polymerization reactors connected in parallel to the side wall were provided were connected in series to the two polymerization reactors connected in parallel, was used.

1,3-Butadiene as the monomer at a flow rate of 7,500 kg/h, hexane as the solvent at a flow rate of 17,432.5 kg/h, and a catalyst composition including nickel octoate, hydrogen fluoride (HF), and triisobutylaluminum (TIBAL) diluted in a hexane solvent at a flow rate of 230 kg/h were added to the two polymerization reactors connected in parallel, respectively. The reaction temperature of each of the polymerization reactors was controlled to 95° C. and the pressure thereof was controlled to 3.0 barg to carry out the polymerization reaction. The gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, and the reaction temperature of the two polymerization reactors connected in parallel and the polymerization reactor connected in series was controlled to 95° C. and the pressure thereof was controlled to 2.8 barg to further carry out the polymerization reaction. The reaction temperature of the polymerization reactor connected in series to the polymerization reactor was controlled to 70° C. and the pressure thereof was controlled to 0.3 barg to further carry out the polymerization reaction, and the gas produced by polymerization heat in the two polymerization reactors connected in series was condensed by the condenser and simultaneously refluxed to the two polymerization reactors connected in parallel.

Comparative Example 1-1

A continuous stirred tank reactor in which a polymerization reactor having a volume of 50 m$^3$ in which a stirring device, a gas discharge pipe provided with a condenser for removing polymerization heat produced during the polymerization reaction in the upper portion using vaporization heat of the gas produced by polymerization heat, a polymer solution discharge pipe for discharging a polymer solution including a polymer produced by the polymerization reaction to the lower portion, and a supply pipe for supplying a polymer solution discharged from the polymerization reactor to the side wall, was connected in series to the polymerization reactor having a volume of 50 m$^3$ in which a stirring device, a gas discharge pipe provided with a condenser for removing polymerization heat produced during the polymerization reaction in the upper portion using vaporization heat of the gas produced by polymerization heat, a polymer solution discharge pipe for discharging a polymer solution including a polymer produced by the polymerization reaction to the lower portion, and a supply pipe for supplying a monomer, a solvent and a catalyst to the side wall, was used.

1,3-Butadiene as the monomer at a flow rate of 12,000 kg/h, hexane as the solvent at a flow rate of 30,735 kg/h, and a catalyst composition including nickel octoate, hydrogen fluoride (HF), and triisobutylaluminum (TIBAL) diluted in a hexane solvent at a flow rate of 180 kg/h were added to the first polymerization reactor. The reaction temperature of the polymerization reactor was controlled to 95° C. and the pressure thereof was controlled to 2.9 barg to carry out the polymerization reaction, the polymer solution discharged from the polymerization reactor was supplied to the polymerization reactor connected in series, and the reaction temperature of the polymerization reactor connected in series was controlled to 100° C. and the pressure thereof was controlled to 1.9 barg to further carry out the polymerization reaction. The gas produced by polymerization heat in each of the reactors was condensed by the condenser and refluxed to the first polymerization reactor.

Comparative Example 1-2

The same polymerization reactor as that of Comparative Example 1-1 was used, but 1,3-butadiene as the monomer at a flow rate of 11,000 kg/h, hexane as the solvent at a flow rate of 31,181 kg/h, and a catalyst composition including nickel octoate, hydrogen fluoride (HF), and triisobutylaluminum (TIBAL) diluted in a hexane solvent at a flow rate of 170 kg/h were added to the first polymerization reactor. The reaction temperature of the polymerization reactor was controlled to 95° C. and the pressure thereof was controlled to 2.9 barg to carry out the polymerization reaction, the polymer solution discharged from the polymerization reactor was supplied to the polymerization reactor connected in series, and the reaction temperature of the polymerization reactor connected in series was controlled to 100° C. and the pressure thereof was controlled to 1.9 barg to further carry out the polymerization reaction. The gas produced by polymerization heat in each of the reactors was condensed by the condenser and refluxed to each of the polymerization reactors.

Comparative Example 1-3

The same polymerization reactor as that of Example 1-1 was used, but 1,3-butadiene as the monomer at a flow rate of 7,250 kg/h, hexane as the solvent at a flow rate of 17,681 kg/h, and a catalyst composition including nickel octoate, hydrogen fluoride (HF), and triisobutylaluminum (TIBAL) diluted in a hexane solvent at a flow rate of 220 kg/h were added to the two polymerization reactors connected in parallel, respectively. The reaction temperature of each of the polymerization reactors was controlled to 95° C. and the pressure thereof was controlled to 2.9 barg to carry out the polymerization reaction. The polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 75° C. and the pressure thereof was controlled to 0.5 barg to further carry out the polymerization reaction, and the gas produced by polymerization heat in each of the reactors was condensed by the condenser and refluxed to each of the polymerization reactors.

Comparative Example 1-4

The same polymerization reactor as that of Example 1-1 was used, but 1,3-butadiene as the monomer at a flow rate of 7,250 kg/h, hexane as the solvent at a flow rate of 17,681 kg/h, and a catalyst composition including nickel octoate, hydrogen fluoride (HF), and triisobutylaluminum (TIBAL) diluted in a solvent at a flow rate of 220 kg/h were added to the two polymerization reactors connected in parallel, respectively. The reaction temperature of each of the polymerization reactors was controlled to 95° C. and the pressure thereof was controlled to 2.9 barg to carry out the polymerization reaction, the polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 100° C. and the pressure thereof was controlled to 1.8 barg to further carry out the polymerization reaction, and the gas produced by polymerization heat was condensed by the condenser and simultaneously refluxed to the two polymerization reactors connected in parallel.

Experimental Example 1

The polymerization reactors of Examples 1-1 and 1-2, and Comparative Examples 1-1 to 1-4 were operated for 3 months, respectively, and amounts (kg/h) of the monomer and the solvent supplied to the first polymerization reactor per hour, amounts (kg/h) of the monomer, the polymer and the solvent transferred from the first polymerization reactor to the second polymerization reactor per hour, amounts (kg/h) of the monomer, the polymer and the solvent, the monomer discharged from the final polymerization reactor per hour, and contents (wt %) of the monomer and the polymer (MPC) in the polymer solution discharged from each of the polymerization reactors are shown in the following Table 1:

TABLE 1

| Classification | | | Example | | Comparative Example | | | |
|---|---|---|---|---|---|---|---|---|
| | | | 1-1 | 1-2 | 1-1 | 1-2 | 1-3 | 1-4 |
| Supply | BD[3)] | kg/h | 14,500 | 15,000 | 12,000 | 11,000 | 14,500 | 14,500 |
| | n-hexane | kg/h | 35,362 | 34,865 | 30,735 | 31,181 | 35,362 | 35,362 |
| | n-hexane/BD | | 2.44 | 2.32 | 2.56 | 2.83 | 2.44 | 2.44 |
| First polymerization reactor[1)] | BD[3)] | kg/h | 1,196 | 1,426 | 1,805 | 1,540 | 580 | 619 |
| | BR[4)] | kg/h | 6,670 | 6,900 | 10,440 | 9,460 | 6,670 | 6,670 |
| | n-hexane | kg/h | 22,989 | 23,873 | 33,013 | 31,181 | 17,681 | 18,256 |
| | MPC | (wt %) | 25.5 | 25.9 | 27.1 | 26.1 | 29.1 | 28.5 |
| Final polymerization reactor[2)] | BD[3)] | kg/h | 580 | 300 | 360 | 440 | 580 | 435 |
| | BR[4)] | kg/h | 13,920 | 14,700 | 11,640 | 10,560 | 13,920 | 14,065 |
| | n-hexane | kg/h | 35,362 | 34,865 | 30,735 | 31,181 | 35,362 | 35,362 |
| | MPC | (wt %) | 29.1 | 30.1 | 28.1 | 26.1 | 29.1 | 29.1 |

[1)]First polymerization reactor: an hourly amount transferred from the two polymerization reactors connected in parallel or the polymerization reactor to which the monomer, the solvent, and the catalyst are first supplied to the second polymerization reactor.
[2)]Final polymerization reactor: an hourly amount discharged from the final polymerization reactor among the polymerization reactors.
[3)]BD: 1,3-butadiene
[4)]BR: Butadiene rubber (polymer)

As shown in the above Table 1, in Examples 1-1 and 1-2 which were carried out according to the present invention, after operation for 3 months, it was confirmed that the polymer was not deposited on the upper portion of the condenser of each of the two polymerization reactors connected in parallel, and it was possible to maintain the polymer concentration of the final polymerization reactor high.

However, in Comparative Example 1-1, after operation for 1 month, the polymer was deposited on the upper portion of the condenser of the first polymerization reactor to block the flow of gas, and after shutdown, the reactor and the condenser were washed.

In addition, in Comparative Example 1-2 in which the content of the solvent was increased relative to the supplied monomer, after operation for 3 months, it was confirmed that the polymer was not deposited on the upper portion of the condenser of the first polymerization reactor, but the polymer concentration of the final polymerization reactor was low.

In addition, when the solvent and the like condensed by the condenser of the final polymerization reactor are resupplied to the final polymerization reactor, not the first polymerization reactor, as in Comparative Example 1-3, and when the solvent and the like condensed in the condenser of the final polymerization reactor are refluxed to the first polymerization reactor, but the temperature of the final polymerization reactor is not adjusted lower than the temperature of the polymerization reactor directly connected by 10° C. or more, as in Comparative Example 1-4, MPC of the first polymerization reactor is high so that the polymer is adhered to the reactor wall surface and the stirrer, and thus, after operation for 1 week and then shutdown, the polymerization reactor and the polymer solution discharge pipe were washed.

Example 2

Example 2-1

Two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for resupplying the gas condensed from the condenser to the polymerization reactor, a polymer solution discharge pipe for discharging a polymer solution including a polymer produced by the polymerization reaction to the lower portion, and a supply pipe for supplying a monomer, a solvent and a catalyst to the side wall were provided, as shown in FIG. 1 were connected in parallel. A continuous stirred tank reactor, in which the polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for supplying the gas condensed from the condenser to the two polymerization reactors connected in parallel, a polymer solution discharge pipe for discharging a polymer solution including a polymer produced by the polymerization reaction to the lower portion, and a supply pipe for supplying the polymer solution which is discharged from the two polymerization reactors connected in parallel to the side wall were provided were connected in series to the two polymerization reactors connected in parallel, was used.

1,3-Butadiene as the monomer at a flow rate of 4,000 kg/h, hexane as the solvent at a flow rate of 20,152 kg/h, and a catalyst composition including neodymium versatate, diisobutylaluminum hydride, and diethylaluminum chloride diluted in a hexane solvent at a flow rate of 170 kg/h were added to the two polymerization reactors connected in parallel, respectively. The reaction temperature of each of the polymerization reactors was controlled to 80° C. and the pressure thereof was controlled to 1.2 barg to carry out the polymerization reaction. The gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 70° C. and the pressure thereof was controlled to 0.3 barg to further carry out the polymerization reaction, and the gas produced by polymerization heat was condensed by the condenser and simultaneously refluxed to the two polymerization reactors connected in parallel.

Example 2-2

Two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for resupplying the gas condensed from the condenser to the polymerization reactor, a polymer solution discharge pipe for discharging a polymer solution including a polymer produced by the polymerization reaction to the lower portion, and a supply pipe for supplying a monomer, a solvent and a catalyst to the side wall were provided, as shown in FIG. 2 were connected in parallel. A continuous stirred tank reactor, in which two polymerization reactors having a volume of 50 m$^3$ in which a stirring device, a gas discharge pipe for discharging gas produced by polymerization heat to the upper portion, a condenser for condensing the gas discharged from the gas discharge pipe, a supply pipe for supplying the gas condensed from the condenser to each of the two polymerization reactors connected in parallel, a polymer solution discharge pipe for discharging a polymer solution including a polymer produced by the polymerization reaction to the lower portion, and a supply pipe for supplying the polymer solution which is discharged from the two polymerization reactors connected in parallel to the side wall were provided were connected in series to the two polymerization reactors connected in parallel, was used.

1,3-Butadiene as the monomer at a flow rate of 4,250 kg/h, hexane as the solvent at a flow rate of 20,657.5 kg/h, and a catalyst composition including neodymium versatate, diisobutylaluminum hydride, and diethylaluminum chloride diluted in a hexane solvent at a flow rate of 180 kg/h were added to the two polymerization reactors connected in parallel, respectively. The reaction temperature of each of the polymerization reactors was controlled to 80° C. and the pressure thereof was controlled to 1.2 barg to carry out the polymerization reaction. The gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, and the reaction temperature of the two polymerization reactors connected in parallel and the polymerization reactor connected in series was controlled to 80° C. and the pressure thereof was controlled to 0.7 barg to further carry out the polymerization reaction. The reaction temperature of the polymerization reactor connected in series to the polymerization reactor was controlled to 67° C. and the pressure thereof was controlled to 0.2 barg to further carry out the polymerization reaction, and the gas produced by polymerization heat in the two polymerization reactors connected in series was condensed by the condenser and simultaneously refluxed to the two polymerization reactors connected in parallel.

Comparative Example 2-1

A continuous stirred tank reactor in which a polymerization reactor having a volume of 50 m$^3$ in which a stirring device, a gas discharge pipe for discharging gas produced by polymerization heat to the upper portion, a condenser for condensing the gas discharged from the gas discharge pipe, a supply pipe for resupplying the gas condensed by the condenser to the polymerization reactor, a polymer solution discharge pipe discharging a polymer solution including a polymer produced by the polymerization reaction to the lower portion, and a supply pipe for supplying the polymer solution discharged from the previous polymerization reactor to the side wall were provided, was connected in series to the polymerization reactor having a volume of 50 m$^3$ in which a stirring device, a gas discharge pipe discharging gas produced by polymerization heat to the upper portion, a condenser for condensing the gas discharged from the gas discharge pipe, a supply pipe for resupplying the gas condensed by the condenser to the polymerization reactor, a polymer solution discharge pipe for discharging a polymer solution including a polymer produced by the polymerization reaction to the lower portion, a supply pipe for supplying a monomer, a solvent, and a catalyst to the side wall were provided, was used.

1,3-Butadiene as the monomer at a flow rate of 5,000 kg/h, hexane as the solvent at a flow rate of 25,190 kg/h, and a catalyst composition including neodymium versatate, diisobutylaluminum hydride, and diethylaluminum chloride diluted in a hexane solvent at a flow rate of 190 kg/h were added to the first polymerization reactor. The reaction temperature of the polymerization reactor was controlled to 80° C. and the pressure thereof was controlled to 1.2 barg to carry out the polymerization reaction, the gas produced by polymerization heat was condensed by the condenser and refluxed to the polymerization reactor, the polymer solution discharged from the polymerization reactor was supplied to the polymerization reactor connected in series, the reaction temperature of the polymerization reactor connected in series was controlled to 88° C. and the pressure thereof was controlled to 1.1 barg to further carry out the polymerization reaction, and the gas produced by polymerization heat was condensed by the condenser and refluxed to the first polymerization reactor.

Comparative Example 2-2

The same polymerization reactor as that of Comparative Example 2-1 was used, but 1,3-butadiene as the monomer at a flow rate of 4,000 kg/h, hexane as the solvent at a flow rate of 22,564 kg/h, and a catalyst composition including neodymium versatate, diisobutylaluminum hydride, and diethylaluminum chloride diluted in a hexane solvent at a flow rate of 170 kg/h were added to the first polymerization reactor. The reaction temperature of the polymerization reactor was controlled to 80° C. and the pressure thereof was controlled to 1.1 barg to carry out the polymerization reaction, the gas produced by polymerization heat was condensed by the condenser and refluxed to the polymerization reactor, the polymer solution discharged from the polymerization reactor was supplied to the polymerization reactor connected in series, the reaction temperature of the polymerization reactor connected in series was controlled to 88° C. and the pressure thereof was controlled to 1.1 barg to further carry out the polymerization reaction, and the gas produced by polymerization heat in each of the reactors was condensed by the condenser and refluxed to each of the polymerization reactors.

Comparative Example 2-3

The same polymerization reactor as that of Example 2-1 was used, but 1,3-butadiene as the monomer at a flow rate of 4,000 kg/h, hexane as the solvent at a flow rate of 20,152 kg/h, and a catalyst composition including neodymium versatate, diisobutylaluminum hydride, and diethylaluminum chloride diluted in a hexane solvent at a flow rate of 170 kg/h were added to the two polymerization reactors connected in parallel, respectively. The reaction temperature of each of the polymerization reactors was controlled to 80° C. and the pressure thereof was controlled to 1.2 barg to carry out the polymerization reaction. Gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 75° C. and the pressure thereof was controlled to 0.3 barg to further carry out the polymerization reaction, and the gas produced by polymerization heat in each of the reactors was condensed by the condenser and refluxed to each of the polymerization reactors.

Comparative Example 2-4

The same polymerization reactor as that of Example 2-1 was used, but 1,3-butadiene as the monomer at a flow rate of 4,000 kg/h, hexane as the solvent at a flow rate of 20,152 kg/h, and a catalyst composition including neodymium versatate, diisobutylaluminum hydride, and diethylaluminum chloride diluted in a hexane solvent at a flow rate of 170 kg/h were added to the two polymerization reactors connected in parallel, respectively. The reaction temperature of each of the polymerization reactors was controlled to 80° C. and the pressure thereof was controlled to 1.2 barg to carry out the polymerization reaction. The gas produced by polymerization heat was condensed by the condenser and refluxed to each of the polymerization reactors, the polymer solution discharged from each of the polymerization reactors was supplied to the two polymerization reactors connected in parallel and the polymerization reactor connected in series, the reaction temperature of the two polymerization reactors connected in parallel and the polymerization reactor connected in series was controlled to 88° C. and the pressure thereof was controlled to 1.1 barg to further carry out the polymerization reaction, and the gas produced by polymerization heat was condensed by the condenser and simultaneously refluxed to the two polymerization reactors connected in parallel.

Experimental Example 2

The polymerization reactors of Examples 2-1 and 2-2, and Comparative Examples 2-1 to 2-4 were operated for 4 weeks, respectively, and amounts (kg/h) of the monomer and the solvent supplied to the first polymerization reactor per hour, amounts (kg/h) of the a monomer, the polymer and the solvent transferred from the first polymerization reactor to the second polymerization reactor per hour, amounts (kg/h) of the monomer, the polymer and the solvent discharged from the final polymerization reactor per hour, and contents (wt %) of the monomer and the polymer (MPC) in the polymer solution discharged from each of the polymerization reactors are shown in the following Table 2:

TABLE 2

| | | | Example | | Comparative Example | | | |
|---|---|---|---|---|---|---|---|---|
| Classification | | | 2-1 | 2-2 | 2-1 | 2-2 | 2-3 | 2-4 |
| Supply | BD[3] | kg/h | 8,000 | 8,500 | 5,000 | 4,000 | 8,000 | 8,000 |
| | n-hexane | kg/h | 40,304 | 41,315 | 25,190 | 22,564 | 40,304 | 40,304 |
| | n-hexane/BD | | 5.04 | 4.86 | 5.04 | 5.64 | 5.04 | 5.04 |
| First polymerization reactor[1] | BD[3] | kg/h | 775 | 877 | 660 | 480 | 52.0 | 573 |
| | BR[4] | kg/h | 3,400 | 3,613 | 4,350 | 3,520 | 3,480 | 3,440 |
| | n-hexane | kg/h | 24,095 | 25,628 | 25,464 | 22,564 | 20,152 | 20,691 |
| | MPC | (wt %) | 14.8 | 14.9 | 16.4 | 15.1 | 16.6 | 16.2 |
| Final polymerization reactor[2] | BD[3] | kg/h | 240 | 170 | 150 | 100 | 240 | 240 |
| | BR[4] | kg/h | 7,760 | 8,330 | 4,850 | 3,920 | 7,760 | 7,760 |
| | n-hexane | kg/h | 40,304 | 41,315 | 25,190 | 22,564 | 40,304 | 40,304 |
| | MFC | (wt %) | 16.6 | 17.1 | 16.6 | 15.1 | 16.6 | 16.6 |

[1]First polymerization reactor: An hourly amount transferred from the two polymerization reactors connected in parallel or the polymerization reactor to which the monomer, the solvent, and the catalyst are first supplied to the second polymerization reactor.
[2]Final polymerization reactor: An hourly amount discharged from the final polymerization reactor among the polymerization reactors.
[3]BD: 1,3-butadiene
[4]BR: Butadiene rubber (polymer)

As shown in the above Table 2, in Examples 2-1 and 2-2 which were carried out according to the present invention, after operation for 4 weeks, there was no gel adhesion on the wall surface and impeller of each of the two polymerization reactors connected in parallel, it was possible to maintain the polymer concentration of the final polymerization reactor high, and the molecular weight distribution (Mw/Mn) of the finally prepared polymer was 2.4, which was the same at the beginning of the reaction and after the operation for 4 weeks.

However, in Comparative Example 2-1, a gel was formed and adhered to the wall surface and the impeller of the first polymerization reactor, after the operation for 1 week, and the gel was adhered also to the polymer solution discharge pipe, and thus, since it was impossible to transfer the polymer solution to the final polymerization reactor, washing was carried out after shutdown. In addition, the molecular weight distribution of the finally prepared polymer was 2.4 at the beginning of the reaction, but the molecular weight distribution of the finally prepared polymer was increased to 2.6 after 1 week.

In addition, in Comparative Example 2-2 in which the content of the solvent was increased relative to the supplied monomer, after the operation for 4 weeks, it was confirmed that there was no gel adhesion on the wall surface and the impeller of the first polymerization reactor, the molecular weight distribution (Mw/Mn) of the finally prepared polymer was 2.4, which was the same at the beginning of the reaction and after the operation for 4 weeks, but the polymer concentration of the final polymerization reactor was low.

In addition, when the solvent and the like condensed by the condenser of the final polymerization reactor are resupplied to the final polymerization reactor, not the first polymerization reactor, as in Comparative Example 2-3, and when the solvent and the like condensed in the condenser of the final polymerization reactor are refluxed to the first polymerization reactor, but the temperature of the final polymerization reactor is not adjusted lower than the temperature of the polymerization reactor directly connected by 10° C. or more, as in Comparative Example 2-4, MPC of the first polymerization reactor is high so that the polymer is adhered to the reactor wall surface and the stirrer, and thus, after operation for 1 week and then shutdown, the polymerization reactor and the polymer solution discharge pipe were washed.

The present inventors were able to confirm from the above results that when the conjugated diene-based polymer is prepared according to the method of preparing a conjugated diene-based polymer according to the present invention, the polymer concentration of the first polymerization reactor is decreased and the polymer concentration of the final polymerization reactor is increased to allow the preparation of the conjugated diene-based polymer at a high concentration, and thus, after the conjugated diene-based polymer is prepared, energy required in the process of removing the solvent and the unreacted monomers from the polymer solution and recovering the polymer may be reduced, and furthermore, gel production in the first polymerization reactor is prevented.

The invention claimed is:

1. A method of preparing a conjugated diene-based polymer, comprising:
adding a conjugated diene-based monomer, a catalyst, and a solvent to parallel polymerization reactors, wherein the parallel polymerization reactors include two or more polymerization reactors connected in parallel, and performing a polymerization reaction to prepare a first polymer solution including a first conjugated diene-based polymer; and
adding the first polymer solution discharged from the parallel polymerization reactors to a series polymerization reactor connected in series to the parallel polymerization reactors and performing a polymerization reaction to prepare a second polymer solution including a second conjugated diene-based polymer,
wherein after the polymerization reaction in the series polymerization reactor, gas produced by polymerization heat is condensed by a condenser in the series polymerization reactor and refluxed to the parallel polymerization reactors, and
a reaction temperature of the series polymerization reactor is maintained to be lower than a reaction temperature of the parallel polymerization reactors by 10° C. or more.

2. The method of claim 1, further comprising:
adding the first polymer solution discharged from the parallel polymerization reactors to an at least one polymerization reactor located between the parallel polymerization reactors and the series polymerization reactor, wherein the at least one polymerization reactor is connected in series between the parallel polymerization reactors and the series polymerization reactor, and performing a polymerization reaction.

3. The method of claim 2, wherein the reaction temperature of the series polymerization reactor is maintained to be lower than a reaction temperature of the at least one polymerization reactor directly connected to the series polymerization reactor, among one or more polymerization reactors connected in series between the parallel polymerization reactors and the series polymerization reactor, by 10° C. or more.

4. The method of claim 1, wherein the reaction temperature of the series polymerization reactor is maintained to be lower than the reaction temperature of the parallel polymerization reactors by 10° C. to 25° C.

5. The method of claim 1, wherein a pressure of the series polymerization reactor is maintained to be lower than a pressure of the parallel polymerization reactors by 0.5 barg or more.

6. The method of claim 1, wherein a pressure of the series polymerization reactor is maintained to be lower than the pressure of the parallel polymerization reactors by 1.0 barg to 2.5 barg.

7. The method of claim 1, wherein the catalyst is one or more Ziegler-Natta catalysts selected from the group consisting of transition metal compounds, lanthanum-based compounds, organic aluminum compounds, and fluorinated compounds; or an organolithium catalyst.

8. The method of claim 1, wherein the solvent is a hydrocarbon-based solvent.

9. The method of claim 1, wherein the method is a continuous preparation method of a conjugated diene-based polymer.

10. An apparatus for preparing a conjugated diene-based polymer, comprising:
parallel polymerization reactors, wherein the parallel polymerization reactors include two or more polymerization reactors connected in parallel;
at least two separate supply pipes coupled to each of the parallel polymerization reactors and configured to supply different materials thereto; and
a series polymerization reactor connected in series to the parallel polymerization reactors; and
one or more polymerization reactors located between the parallel polymerization reactors and the series polymerization reactor, wherein the one or more polymerization reactor is connected in series between the parallel polymerization reactors and the series polymerization reactor, wherein the series polymerization reactor comprises a condenser for condensing gas produced by polymerization heat and refluxing the gas to the parallel polymerization reactors, and a reaction temperature of the series polymerization reactor is maintained to be lower than a reaction temperature of the parallel polymerization reactors by 10° C. or more.

11. The apparatus of claim 10, wherein the parallel polymerization reactors and the series polymerization reactor are continuous stirred tank reactors (CSTR).

12. The apparatus of claim 10, wherein two or more polymerization reactors of the parallel polymerization reactors comprise a condenser for condensing gas produced by polymerization heat and refluxing the gas to each of the parallel polymerization reactors, respectively.

13. The apparatus of claim 10, wherein the reaction temperature of the series polymerization reactor is maintained to be lower than a reaction temperature of a polymerization reactor directly connected to the series polymerization reactor, among the one or more polymerization reactors connected in series between the parallel polymerization reactors and the series polymerization reactor, by 10° C. or more.

14. The apparatus of claim 10, wherein the reaction temperature of the series polymerization reactor is maintained to be lower than the reaction temperature of the parallel polymerization reactors, by 10 to 25° C.

15. The apparatus of claim 13 wherein, the reaction temperature of the polymerization reactor is maintained to be lower than the reaction temperature of the series polymerization reactor directly connected to the polymerization reactor, among the one or more polymerization reactors connected in series between the parallel polymerization reactors and the polymerization reactor, by 10 to 25° C.

* * * * *